Dec. 1, 1970   R. G. ROHRBERG ET AL   3,543,326
CARPET CLAMPING METHOD AND MEANS

Filed Jan. 18, 1967   2 Sheets-Sheet 1

INVENTORS
RODERICK G. ROHRBERG
BY VERNON J. CARRIER

ATTORNEY

Dec. 1, 1970   R. G. ROHRBERG ET AL   3,543,326

CARPET CLAMPING METHOD AND MEANS

Filed Jan. 18, 1967   2 Sheets-Sheet 2

INVENTORS
RODERICK G. ROHRBERG
BY VERNON J. CARRIER

ATTORNEY

United States Patent Office 3,543,326
Patented Dec. 1, 1970

3,543,326
CARPET CLAMPING METHOD AND MEANS
Roderick G. Rohrberg, 2742 W. 234th St. 90501, and
Vernon J. Carrier, 3654 Spencer St., Apt. 119 90503,
both of Torrance, Calif.
Filed Jan. 18, 1967, Ser. No. 610,120
Int. Cl. A47g 27/04
U.S. Cl. 16—16                                                          13 Claims

ABSTRACT OF THE DISCLOSURE

This invention relates to clamping method and means such as may be used to retain and otherwise secure flexible materials, especially rugs, rug pads, carpets, plastic floor coverings and the like, to adjoining surfaces or structures such as floors, walls, steps, thresholds or corners therebetween.

The disclosure is of an elongate plastic or metal clamp for gripping the edge of a carpet to stretch and retain the same in close contact with floors. The gripping force results from a wedging action and does not depend upon resiliency in the clamp material of construction. The clamp is rapidly installed by progressive application of force on a holding strip to force the same into a supporting base strip, and the stated elements may be separated by prying apart and are reusable. Some modifications of the concept provide electrical wiring, decorative and functional advantages by forming the clamp integrally with a baseboard.

SUMMARY OF THE INVENTION

According to a preferred embodiment of this invention, there is provided a clamp having a stationary upstanding ridge adapted to extend the entire length of the carpet edge which is sought to be clamped. The carpet is stretched taut with its peripheral edge laid over the first stated ridge, and an elongate holding member having a downwardly depending second ridge is lowered onto the carpet material proximate the carpet edge and silightly misaligned horizontally with respect to the first stated ridge, whereby the carpet is securely held by a wedging action between the two ridges. The second ridge may be moved by deforming the material in the clamp according to one embodiment thereof, or by joining two separable portions of the clamp together by a dovetail type joint in another embodiment thereof. In either case, the clamp may also be provided with an upwardly extending projection of tapered or otherwise decoratively shaped configuration and size suitable to function as a baseboard, and such baseboard may incorporate imbedded wiring to provide increased versatility in connecting electrical items such as lamps in a room any place where the carpet clamp extends rather than only at localized electrical wall outlets.

DETAILED DESCRIPTION

Figure 1:
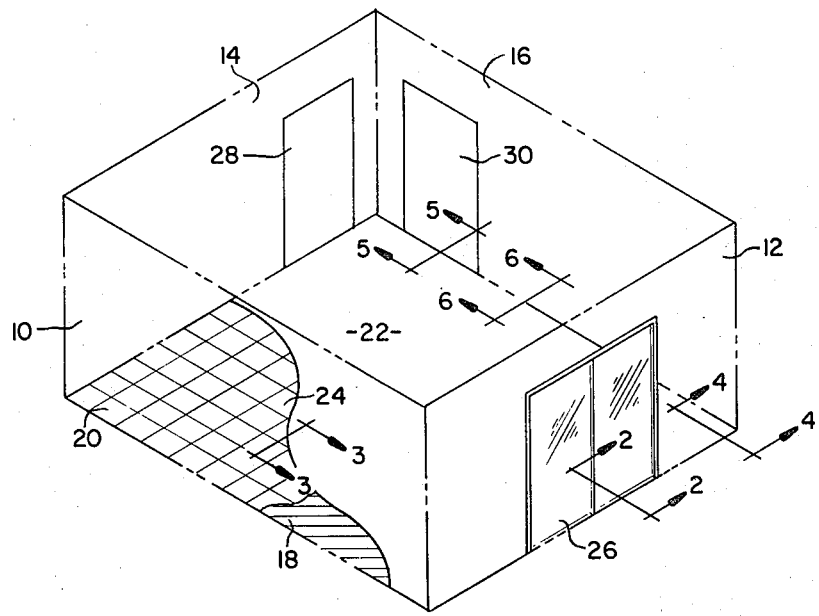
FIG. 1 shows a general perspective view of a room having wall to floor joints and thresholds incorporating different forms of the novel clamp disclosed herein.

With reference to the drawings described above, and particularly to FIG. 1, the invention disclosed herein may be seen to provide clamping means taking various different forms as required for adaptability in different locations of a room. In FIG. 1, for example, externally facing walls 10 and 12 are joined to internal walls 14 and 16 to enclose a room having a floor 18 appropriately covered with one or more types of conventional floor covering. Illustratively, floor 18 in FIG. 1 has a ceramic tile or vinyl floor covered portion 20 and a tufted carpet 22 covering an adjacent portion and separated by a line of juncture 24 from portion 20. The room thus typically represented in FIG. 1 also has a sliding glass door 26 facing exteriorly, and two interior doors 28 and 30 in walls 14 and 16, respectively, communicating with halls or other rooms within a house of which the structure shown in FIG. 1 may form a part.

Figure 2:
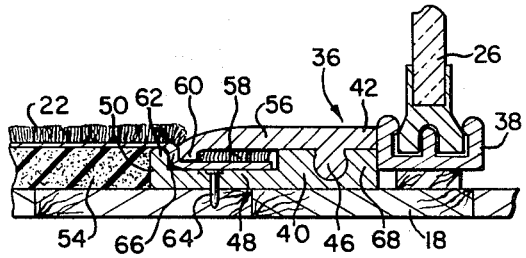
FIG. 2 shows a vertical cross-sectional view taken through a sliding door and threshold as indicated by line 2—2 in FIG. 1.
Figure 2A:
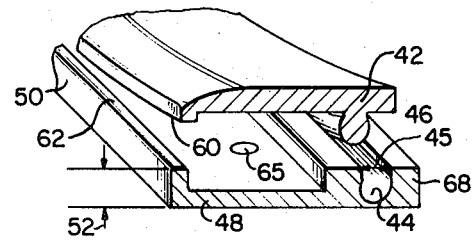
FIG. 2a shows an isolated perspective view of the clamp from FIG. 2.

Referring to FIG. 2 taken along line 2—2 of FIG. 1, it may be seen that clamp 36 is adapted for use in association with a threshold such as formed by door 26 and securely holds carpet 22 along the edge thereof contiguous with track member 38 or the like adapted to support door 26 in sliding relationship therewith. As seen more particularly in FIGS. 2 and 2a, clamp 36 comprises two separable elements 40 and 42 which may conveniently be termed the base member and the vise member, respectively. Both stated members are of generally elongate form and both have greater width than height in the embodiment shown in FIG. 2. Base member 40 is provided with groove means in the form of a rounded elongate cavity or groove 44 seen more clearly from FIG. 2a which traverses the length of the clamp and is coextensive therewith. Groove 44 is symmetrical about a vertical center line therethrough as seen in cross-section, and has a greater width proximate the bottom of the groove than at the top, resulting in a relatively narrow neck portion 45. Vise member 42 has elongate projecting means in the form of downwardly depending bead or ridge 46 of oppositely corresponding shape relative to groove 44 and sized to fit forcibly and snugly therein by application of force in the manner of a dovetail joint to retain elements 40 and 42 securely but releasably in substantially uniform linear contacting relationship throughout their entire length along the relatively massive edge portion of both members proximate the dovetail joint. Base member 40 further includes flange-like projecting means in the form of flange portion 48 extending laterally from massive edge portion 41 and culminating at the distal edge of the flange in an upturned lip or retaining ridge 50 forming a recess to receive a peripheral edge of carpet 22. The total height of ridge 50 indicated by reference numeral 52 in FIG. 2a should preferably not exceed the total thickness of rug pad 54 which typically underlies and supports carpet 22 as shown in FIG. 2. Flange portion 48 is thin and therefore more resiliently deformable than the more bulky massive edge portion of member 40 proximate groove 44.

With elements 40 and 42 structurally joined in the relationship shown by FIG. 2, it may be seen that flange-like projecting portion 56 on vise member 42 overlies flange 48 on member 40 and cooperatively forms therewith recess means in the form of cavity or recess 58 in FIG. 2. Flange 56 terminates at its distal end in a generally downwardly projecting lip 60 which is formed on member 42 so that when bead 46 is fully contained within groove 44, lip edge 60 will be positioned in slightly spaced-apart relationship with ridge 50 and lower than the uppermost surface 62 formed thereon, for reasons which will appear more clearly hereinbelow. Alternative to the stated relationship between ridge 50 and lip 60 shown in FIG. 2, a beaded edge 61 adapted to wedge beneath a beaded edge 63 may be provided as shown in FIG. 2c for more positive holding force where severe pulling force is anticipated for carpet 22.

Use of the clamp described above and shown, for example, in FIGS. 2 and 2a may appropriately begin by initially securing base member 40 to floor 18 by any suitable means such as widely spaced-apart nails 64 passing through holes 65 provided in flange 48 as suggested in FIGS. 2 and 2a. Alternatively, element 40 may be secured by adhesives or the like. Thereafter, rug pad 54 is placed over floor 18 and trimmed as necessary to make substantially uniform and continuous contact with ridge 50 as suggested in FIG. 2. Carpet 22 is then laid atop pad 54 and a peripheral edge of the carpet is draped over ridge 50 into the recess formed within base element 40. Thereafter, vise member 42 is aligned over base member 40 with bead 46 lightly touching member 40 along the narrow gap or neck portion 45 formed at the entrance of groove 44. Thereafter, application of force downwardly along member 42 and progressively throughout the full length thereof such as by a series of hammer blows will securely and releasably join the members 40 and 42 in the relationship suggested by FIG. 2.

In the foregoing relationship, it may be seen that ridge 50 and lip 60 are so related by the dimensional and structural arrangement of elements 40 and 42 as to pinch or otherwise grasp carpet 22 within a narrow lateral gap 66 formed between the two stated items and shown more particularly in FIG. 2. As a result of the force applied to carpet 22 within the stated gap, it will be understood that flange 56 on member 42 is essentially under compressive stress while flange 48 on member 40 is essentially stressed in tension. The foregoing stresses result from the fact that vise-like gripping force between items 50 and 60 exerted on carpet 22 are reacted by ridge 50 in one direction and by bead 46 in the opposite direction. Thus, the materials of construction in elements 40 and 42 are mainly stressed in substantially pure compression and tension, respectively, by the reaction forces of the gripping loads on carpet 22. Flange 56 on member 42 is stressed in a horizontal direction as viewed in FIG. 2, for example, whereby the gripping force applied to carpet 22 does not primarily depend upon the capacity of flange 56 to resist deformation in a vertical direction, although some resistance of this type is desirable even if not strictly necessary. Accordingly, if the material of construction of vise member 42 is not a high strength metal, for example, and abnormally severe pulling loads due to vibration or the like are applied to carpet 22, the variation of detail shown in FIG. 2c is well adapted to insure absolute holding force even when vise member 42 is relatively flexible plastic. The relationship between lip 60 and ridge 50 thus established in FIG. 2, for example, is closely analogous to an over-center toggle link system wherein the center pivot axis between two connected links moves across an imaginary line connecting the two pivot axes on the opposite ends of the links. As applied to the instant case, the lower edge portion of lip 60 is positioned vertically below an imaginary line extending between upper edge 62 of ridge 50 and a point substantially centered in neck portion 45. Moreover, as seen from the transverse cross-sectional view through the clamp elements shown in FIGS. 2 and 3, for example, the carpet portion contained within recess 58 is forcibly folded and retained therein by two changes of direction of the carpet material, each being substantially 90 degrees.

Disengagement of members 40 and 42 is accomplished by application of force upwardly on flange 56 by suitable leverage means such as inserting a new driver through gap 60 within cavity 58 and prying upwardly thereon. However, it will be understood that any force applied to raise flange 56 upwardly, either by prying or by pulling on carpet 22, will be resisted by reaction ridge 68 on base member 40. Thus, bead 46 contained within groove 44 comprises a moment center about which upward force on flange 56 would tend to cause rotation and such rotation will be resisted by reaction ridge 68 acting in opposition to the stated force.

Figure 2B:
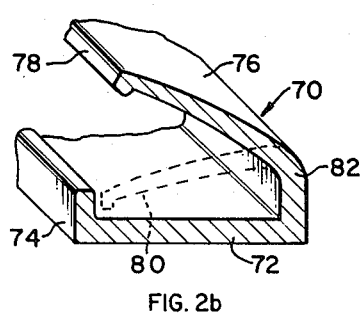
FIG. 2b shows a view corresponding with FIG. 2a but comprising a modification of the structural configuration shown therein.
Figure 2C:
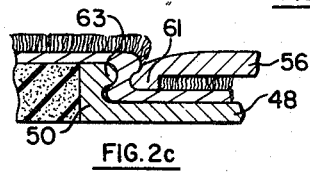
FIG. 2c shows an isolated fragmentary view of a detail modification from the structure shown in FIGS. 2a and 2b.

Referring to FIG. 2b, it may be seen that base and vise members 40 and 42 shown in FIG. 2 may be integrally formed as illustrated by clamp 70 comprising a single unitary mass. Clamp 70 has a relatively stationary base portion 72 with upwardly projecting ridge 74 thereon functioning in the same manner as ridge 50 described above. Clamp 70 further comprises a relatively movable vise portion 76 integrally formed with a wall portion 82 connecting portions 72 and 76. Vise portion 76 has a generally downwardly directed lip 78 formed thereon which functions in the manner of lip 60 described above. Installation of clamp 70 is generally similar to that described in connection with clamp 36 above, except that clamping force is applied after carpet 22 is draped over ridge 74 by downward and progressive application of force to deform vice portion 76 from the position shown by solid lines in FIG. 2b into the clamping position suggested by dash lines 80 in the same figure. It will be understood by those skilled in the art that the gripping action of clamp 70 is analogous to that described for clamp 36, wherein the tensile and compression stresses in portions 72 and 76, respectively, primarily determine the amount of gripping force applied to carpet 22 by reason of the fact that lip 78 is substantially lower than the topmost portion of ridge 74 and lower than the corner formed between vise portion 76 and vertical wall portion 82 formed on flange 70. The gripping force thus achieved is enhanced by the fact that upper portion 76 of clamp 70 may be curved in its naturally formed state and flattened at installation as shown by lines 80.

Figure 3:
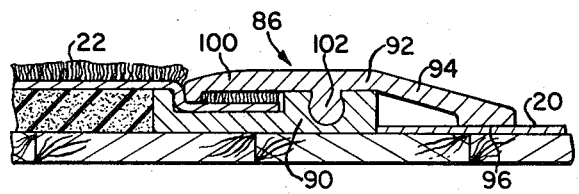
FIG. 3 shows a cross-sectional view through a clamp adapted for use between two different types of floor covering and indicated by 3—3 in FIG. 1.

Referring to FIG. 3, which is taken along line 3—3 of FIG. 1, it may be seen that clamp 86 is a modification of clamp 36 from FIG. 2, and differs therefrom mainly by the addition of a flange portion 94 on vise member 92 which is otherwise structurally related to base member 90 in the same manner described above in connection with members 40 and 42. Flange 94 has a bearing surface 96 formed thereon and adapted to make substantially uniform area contact with floor covering 20 which may differ materially from carpet 22. Thus, clamp 86 is adapted to function as a dividing strip between two differing areas defined by floor coverings 20 and 22 as suggested by line 24 in FIG. 1.

The gripping action between members 90 and 92 in clamp 86 in respect of carpet 22 is precisely the same as discussed above in connection with clamp 36. However, it will be understood by those skilled in the art that any tendency of pulling force from carpet 22 or other external loads which might tend to raise vise member 92 upwardly anywhere along flange 100 thereon would tend to rotate member 92 about a center axis through bead 102 formed thereon, and that such rotation will be resisted by a moment arm roughly defined by the distance between bead 102 and bearing surface 96. The foregoing tendency of member 92 to resist external loads applied upwardly on flange 100 corresponds in principle with the phenomena described hereinabove in connection with ridge 68 on base member 40 of clamp 36, except that flange 94 results in vastly greater resistance to such loads because of the moment arm being much greater than in the case of clamp 36.

Figure 3A:
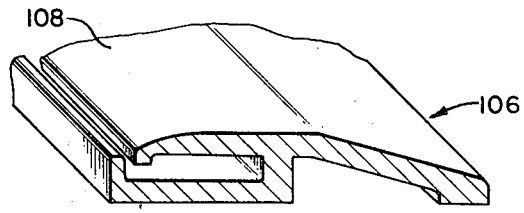
FIG. 3a is an isolated perspective view of a modification of the clamp from FIG. 3.

Installation of clamps 86 and 106 shown in FIGS. 3 and 3a corresponds in all essential particulars with the procedures discussed hereinabove in connection with FIGS. 2 and 2b, respectively. Thus, it may be seen that clamp 86, instead of being formed as two separable components 90 and 92 may be intergrally formed in a single unitary mass as illustrated by clamp 106 shown in FIG. 3a, it being understood that vise portion 108 of clamp 106 is deformable from open position into clamping position in the same manner as described in connection with vise portion 76 of clamp 70.

Figure 4:
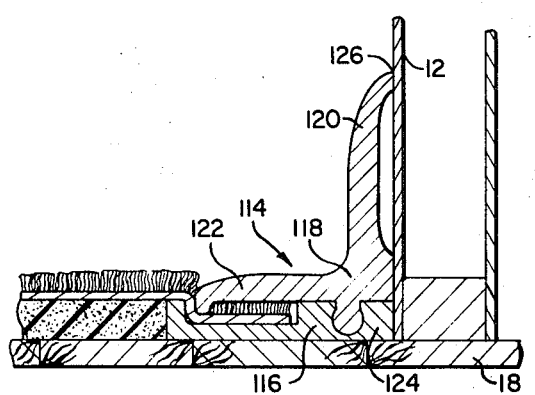
FIG. 4 shows a vertical cross-sectional view through a combined clamp and baseboard and taken along line 4—4 in FIG. 1.
Figure 4A:
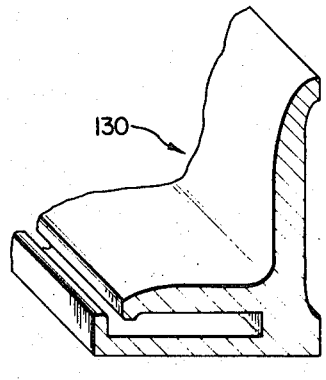
FIG. 4a shows an isolated perspective view of a modification of the clamp and baseboard embodiment of FIG. 4.

Referring to FIG. 4, which is taken along line 4—4 in FIG. 1, it may be seen that carpet clamp 114 is adapted for use along a wall such as wall 12 shown in FIG. 1. Clamp 114 comprises a base member 116 and a vise member 118 joined together by a dovetail type joint similar to that formed by groove 44 and bead 46 discussed hereinabove in connection with clamp 36. However, clamp 114 differs from the other modifications disclosed herein in the fact that vise member 118 is integrally formed with an upwardly extending flange-like projecting portion 120 adapted to function as a baseboard. It will be understood that members 116 and 118 need not be of the same material, and that member 116 may comprise metal such as aluminum or the like and member 118 may comprise plastic or wood, or any other material colored or textured to give the appearance of wood. Moreover, where desirable or convenient, clamp 114 may comprise plastic having decorator color adapted to blend with carpet 22 or any other furnishings in the room where the clamp is used. In addition, it will be understood that external forces applied to flange portion 122 on vise member 118 tending to move the same upwardly are resisted both by reaction ridge 124 and by flange portion 120 which makes contact with wall 12 at the topmost lip or edge 126 thereof. It may further be understood that clamp 114 may be formed in a single unitary mass as suggested by clamp 130 shown in FIG. 4a which may correspond generally with clamp 114 except for the integral relationship between base member 116 and vise member 118.

Figure 4B:
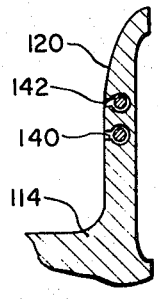
FIG. 4b is an isolated fragmentary cross-sectional view of the clamps shown in FIGS. 4 and 4a, showing a detail applicable to either.

Moreover, clamp 114 shown in FIG. 4 may advantageously be provided with a pair of elongate conductors imbedded therein along baseboard portion 120 as suggested in FIG. 4b. Thus, baseboard portion 120 may be provided with two or more keyhole type grooves 140 and 142 adapted to receive a pair of conductors which may be contained therewithin such as heavy wires or rods suitably connected with a source of electrical power (not shown) and adapted to receive standard male type lamp plugs anywhere along the entire length of baseboard portion 120.

Figure 5:
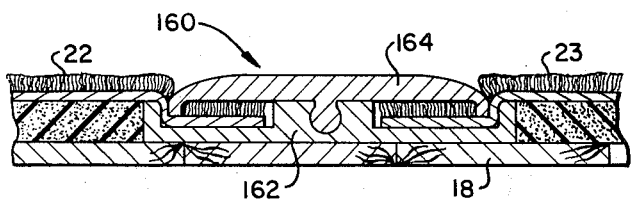
FIG. 5 shows a vertical cross-section through a clamp adapted for use in a threshold and taken along line 5—5 in FIG. 1.
Figure 5A:
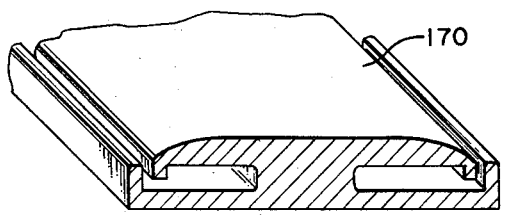
FIG. 5a is an isolated perspective view of a modification of the clamp shown in FIG. 5.

Referring to FIG. 5 taken along line 5—5 of FIG. 1, it may be seen that carpet clamp 160 is adapted for use in a threshold such as formed by door 30 and functions to securely hold carpet 23 on one side of the threshold and carpet 22 on the other side thereof. Lower base and upper vise members 162 and 164, respectively, of clamp 160 may be separately joined by a dovetail type joint as discussed in connection with groove 44 and bead 46 of clamp 36 hereinabove. The base and vise members of clamp 160 thus shown in FIG. 5 are structurally related and function to grip carpets 22 and 23 in the same manner and with the same advantages disclosed hereinabove in connection with clamp 36. Moreover, clamp 160 may be formed as a single unitary mass as suggested by clamp 170 shown in FIG. 5a wherein base portion 162 is integrally formed with vise portion 164 in a manner generally corresponding with the integral type of construction discussed for the various clamps disclosed hereinabove.

Figure 6:
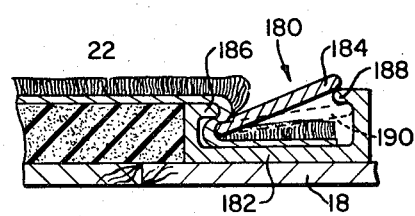
FIG. 6 is a vertical cross-sectional view of a modification of the clamp shown in FIG. 2b and taken along line 6—6 of FIG. 1.

Referring to FIG. 6 taken along line 6—6 of FIG. 1, a further modification of an embodiment incorporating the inventive principles disclosed herein is illustratively shown by clamp 180. Clamp 180 comprises a track or chanel 182 forming a base element and having oppositely facing mutually confronting and spaced-apart flanges 186 and 188. Holding force to prevent movement of carpet 22 within base member 182 is provided by vise element 184 which may consist of an elongate flat rod or strip of convenient material and inexpensive manufacture. Vise element 184 is adapted to apply wedging force to carpet 22 when forced from the position shown by solid lines in FIG. 6 into the position suggested by broken lines 190 in the same figure, whereby the opposite side edges of strip 184 are engaged under flanges 186 and 188 and within the recess formed thereby, thus securely retaining carpet 22 under any amount of desired tension. It will be understood from the structure thus disclosed and shown by FIG. 6 that vise element 184 may be subjected to considerable compressive force due to the wedging action resulting from forced fitting of element 184 into the position shown by lines 190 within base member 182. Moreover, the structural relationship of flanges 186 and 188 with member 184 result in holding clamp means which do not protrude above the level of rug 22, hence offers no interference with furniture or with movement along the carpet edge thus secured by clamp 180.

Figure 7:
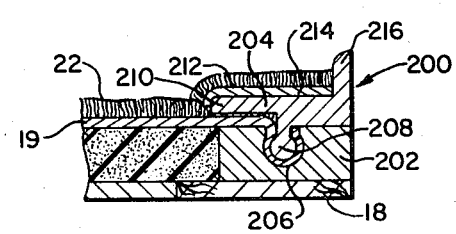
FIG. 7 is a vertical cross-sectional view of another modification incorporating the inventive principles taught herein.

Referring to FIG. 7, a clamp 200 is shown which functionally corresponds somewhat with the embodiment shown in FIG. 4. However, clamp 200 comprises base element 202 of substantially rectangular cross-sectional shape and having a groove 206 formed therein and shaped substantially as described hereinabove for groove 44 and narrow neck portion 45 in connection with FIG. 2a, for example. Groove 206 in base element 202 is sized and shaped to receive a downwardly depending ridge or bead 208 formed on elongate vise member 204. However, instead of the snugly fitting relationship described hereinabove for groove 44 and bead 46 shown in FIGS. 2 and 2a, bead 208 is sized substantially smaller than groove 206 in the clamp of FIG. 7, whereby the backing material 19 from carpet 22 is wedged into the recess comprising groove 206 and securely held therein by bead 208. Vise element 204 is provided with a flange portion 210 adapted to overlie a portion of carpet 22 and acting to prevent pivoting movement of element 204 about a center through bead 208. Moreover, the upper surface 212 of element 204 is substantially flat and adapted to receive a strip of carpeting identical with carpet 22 in the manner suggested by strip 214 shown in FIG. 7, either with or without a baseboard-like projection 216 also shown in the same figure. It will be understood that carpet strip 214, when used with clamp 200 in the manner suggested by FIG. 7, results in carpet clamp means which are virtually invisible when viewed from a vantage point directly above the clamp.

Figure 8:
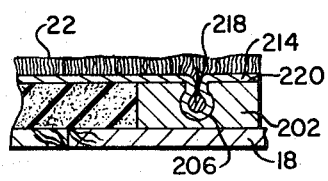
FIG. 8 is a view generally corresponding with FIG. 7, but showing a modification of the clamp shown in FIG. 7.

Referring to FIG. 8, a further modification of the clamp shown in FIG. 7 is suggested whereby base element 202 is substantially identical as between FIGS. 7 and 8, but vise element 204 is replaced by a single substantially cylindrical elongate rod 218 in FIG. 8 adapted to force fit within the recess formed by groove 206 to secure carpet 22 therewithin as shown. Moreover, an additional strip of carpet 214 may be secured to surface 220 of base member 202 as shown in FIG. 8 to render the clamp of FIG. 8 completely imperceptible to the naked eye.

From the discussion set forth above and the structure disclosed in the accompanying drawings, it may be seen that all of the embodiments shown in this case involve a recess adapted to receive a peripheral edge of a carpet, and means for applying wedging force on the peripheral edge whereby the holding force does not primarily depend upon the inherent stiffness or rigidity of the construction materials used in the carpet clamp. Thus, in all of the embodiments shown herein, force is applied laterally as between portions 60 and 62 of clamp 36 shown in FIG. 2, or between bead 208 and groove 206 shown in FIG. 7, for example. Moreover, in every case, the clamp is releasable and reusable either in precisely the same location of a room or in different rooms when moved from place to place. Moreover, the same carpeting may be secured by several of the different clamp embodiments successively used as disclosed herein without perforating, tearing or shredding of the carpet peripheral edge, since all of the clamps disclosed herein are characterized by the absence of nails or hooks passing through the carpet material. Thus, when completely installed, the carpet clamp embodiments of this case present no danger to bare feet such as sometimes encountered with upwardly directed nail points in carpet clamps known to the prior art. Also, the embodiments of the carpet clamp principles disclosed herein eliminate the exposed cavities along carpet edges which collect dirt, lint and germs in clamps known to the prior art. Moreover, due to the application of force laterally to grip the carpet edge, the clamp structure of this case has relatively little height and may have little width, thus resulting in a minimum of interference with vacuum cleaners and permitting such devices to get closer into corners and wall to floor joints than is possible with many conventional baseboard and carpet clamp arrangements familiar to those skilled in the art.

While the particular details set forth above and in the drawings are fully capable of attaining the objects and providing the advantages herein stated, the structure and method thus disclosed are merely illustrative and could be varied or modified to produce the same results without departing from the scope of the inventive concept as defined in the appended claims.

We claim:

1. A clamp for securing a tufted carpet or the like to a floor, said carpet having a relatively stiff backing material supporting a plurality of tufts and overlying a pad having substantial thickness, said clamp comprising:
   a first clamp portion attachable to said floor and having recess means for receiving a peripheral edge of said carpet proximate a peripheral edge of said pad, said recess means being spaced above said floor a distance substantially equal to said pad thickness, and
   a second clamp portion forcibly engagable with said recess means and operatively related therewith to apply compressive force to said carpet edge only along a thin line proximate said edge and in a lateral direction substantially parallel to said floor to hold said edge within said recess, said second clamp portion being stressed in compression and said first clamp portion being stressed in tension by the reaction loads from said compressive force.

2. The clamp structure set forth in claim 1 above, wherein:
   said second portion comprises elongate vise means separate from said first portion,
   said second portion including a projecting ridge, and said first portion including a groove for receiving said ridge in forced-fitting relationship, said groove being spaced apart from said recess.

3. The clamp structure set forth in claim 2 above, wherein:
   said projecting ridge consists of an elongate bead of generally round cross-sectional shape, and
   said groove consists of an elongated hollow cavity within said first portion, said cavity having a generally round cross-sectional contour and communicating with an external surface of said first portion through a narrow gap of less width than the diameter of said generally round bead.

4. The clamp structure set forth in claim 1 above, wherein:
   said clamp comprises a single unitary mass with said second portion integrally formed with said first portion and forcibly deformable into and out of said position of engagement therewith.

5. The clamp structure set forth in claim 3 above, including in addition thereto:
   an upstanding flange-like projection extending generally upwardly from said second portion and integrally formed therewith.

6. The structure set forth in claim 5 above, further including:
   elongate slot means formed in said upstanding flange-like projection, and
   elongate electrical conductor means contained within said slot means for contacting blade-type electrical plugs.

7. The structure set forth in claim 1 above, wherein:
   said recess means comprises an elongate groove having a generally round cross-sectional contoured surface and communicating with an external surface of said first portion through a narrow elongate gap of less width than the diameter of said generally round cross-sectional contoured surface.

8. The structure set forth in claim 1 above, wherein:
   said first portion includes a flange portion integrally formed thereon, said flange portion terminating in an upturned lip,
   said second portion includes a flange portion integrally formed thereon, said flange portion terminating in a downwardly extending lip, and
   said upturned lip being spaced apart laterally from said downwardly extending lip by a distance less than the thickness of said carpet when said first and second portions are in said position of forcible engagement.

9. The structure set forth in claim 8 above, further including:
   an upstanding flange-like projection extending upwardly from said second portion and integrally formed therewith.

10. A two piece clamp for securing relatively thick tufted carpet material to a floor, said clamp comprising:
    an elongate base strip channel member having a substantially flat mid-portion adapted to contact said floor, and attachable thereto, said channel member further having a pair of oppositely facing mutually confronting spaced-apart flanges defining an elongate recess adapted to receive a peripheral edge portion of said carpet material therein, said recess having an upturned substantially vertical lip over which said carpet edge is draped, and
    an elongate wedge having a substantially horizontal flange portion with an elongate distal edge thereon; said wedge having a width sufficient to extend in forcible contact between said spaced-apart flanges and to apply compressive force continuously along said peripheral edge of said carpet material between said distal edge and said upturned lip along a narrow line of contact while the remainder of said carpet edge within said recess is free of stress.

11. A two piece clamp for clamping carpet material to a floor, comprising:
    a first elongated base member having a substantially flat upper surface on a portion thereof and an elongate groove in said surface,
    said groove having a generally round cross-sectional surface configuration communicating with said flat surface through a first gap of less width than the diameter of said generally round cross-sectional surface, an elongate vise member having a projecting ridge integrally formed thereon, said ridge having a substantially round cross-sectional contour adapted for forcible engagement within said groove to releasably secure said vise member to said base member, a first flange portion on said base member, said flange portion extending parallel to and contacting said floor, said flange portion terminating in an elongate upturned lip having an elongate distal edge thereon, a second flange portion on said vise member, said second flange portion overlying said first flange portion and terminating in an elongate downwardly extending lip, and said upturned lip being spaced apart laterally from said downwardly extending lip forming a narrow elongate second gap, said second gap having a substantially uniform width less than the thickness of said carpet, and said second gap lying vertically below an imaginary line extending between the highest point on said distal edge and a point substantially centered in said first gap when said clamp is viewed in cross-section on a plane normal to the longitudinal axes of said first and second members.

12. A clamp for securing a relatively thick tufted carpet to a floor, said clamp comprising:

an elongate base strip attachable to said floor, said base strip having an elongate recess for receiving a peripheral edge of said carpet, said recess having an upturned substantially vertical lip over which said carpet edge is draped, and an elongate wedge for forcibly engaging said base strip, said wedge having a substantially horizontal flange portion with an elongate distal edge thereon, said elongate wedge compressing said carpet between said distal edge and said upturned lip along a narrow elongate line of contact while the remainder of said carpet edge within said recess is free of stress.

13. A method of clamping a carpet peripheral edge to secure said carpet to a floor comprising:

securing an elongate first clamping element having an elongate recess to said floor, placing said peripheral edge over said elongate recess, placing an elongate second clamping element in close juxtaposition with said first clamping element, and progressively applying force to said second clamping element along the length thereof to force said second clamping element into said recess throughout their total length and to wedge said edge into said recess and between said first and second clamping elements.

References Cited
UNITED STATES PATENTS

| | | | |
|---|---|---|---|
| 862,023 | 7/1907 | Scroggins et al. | 16—16 |
| 2,811,756 | 11/1957 | Bradley | 52—717 |
| 2,449,904 | 9/1948 | Lorraine | 16—7 |
| 2,496,910 | 2/1950 | Fridolph | 16—7 |

BOBBY R. GAY, Primary Examiner

D. L. TROUTMAN, Assistant Examiner